(12) United States Patent
Tamiya et al.

(10) Patent No.: US 10,442,950 B2
(45) Date of Patent: Oct. 15, 2019

(54) FILM FORMED ON A SLIDING SURFACE OF A COMPONENT

(71) Applicant: CANON KABUSHIKI KAISHA, Tokyo (JP)

(72) Inventors: Hirotomo Tamiya, Kawasaki (JP); Nobuyuki Kume, Miura-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/974,950

(22) Filed: May 9, 2018

(65) Prior Publication Data

US 2018/0334583 A1 Nov. 22, 2018

(30) Foreign Application Priority Data

May 18, 2017 (JP) .................................. 2017-099304
Apr. 17, 2018 (JP) .................................. 2018-079418

(51) Int. Cl.
| | | |
|---|---|---|
| *C09D 127/18* | (2006.01) |
| *G03B 9/36* | (2006.01) |
| *G03B 9/14* | (2006.01) |
| *G01J 3/04* | (2006.01) |
| *G03B 9/08* | (2006.01) |
| *G03B 9/18* | (2006.01) |
| *G03B 9/10* | (2006.01) |

(52) U.S. Cl.
CPC .............. *C09D 127/18* (2013.01); *G01J 3/04* (2013.01); *G03B 9/08* (2013.01); *G03B 9/10* (2013.01); *G03B 9/14* (2013.01); *G03B 9/18* (2013.01); *G03B 9/36* (2013.01)

(58) Field of Classification Search
CPC .......................................................... G01J 3/04
USPC ........................................................ 396/483
See application file for complete search history.

(56) References Cited

U.S. PATENT DOCUMENTS

| | | | | |
|---|---|---|---|---|
| 4,775,583 A | * | 10/1988 | Kawamura ........... B29C 70/086 396/479 |
| 4,965,617 A | * | 10/1990 | Matsubara .............. B32B 27/04 359/234 |
| 5,025,278 A | * | 6/1991 | Matsubara .............. B32B 27/04 359/234 |
| 5,202,715 A | * | 4/1993 | Matsubara ............... G03B 9/00 396/452 |
| 5,283,098 A | * | 2/1994 | Matsubara ............... G03B 9/00 428/113 |
| 5,665,825 A | * | 9/1997 | Davies .................... C08L 27/18 525/189 |
| 6,001,465 A | * | 12/1999 | Takahashi ............... B32B 27/34 428/220 |

(Continued)

FOREIGN PATENT DOCUMENTS

| | | | | |
|---|---|---|---|---|
| JP | 2002-031829 A | | 1/2002 | |
| JP | 2002031829 | * | 1/2002 | ............... G03B 9/10 |

(Continued)

*Primary Examiner* — Clayton E. LaBalle
*Assistant Examiner* — Kevin C Butler
(74) *Attorney, Agent, or Firm* — Venable LLP

(57) ABSTRACT

A film is formed on a sliding surface of a component. The film contains fluororesin. The film includes a surface structure in which convex portions are joined with each other like a mesh. Each of the convex portions is formed by particles of fluororesin having aggregated.

19 Claims, 8 Drawing Sheets

(56) References Cited

U.S. PATENT DOCUMENTS

| | | | | |
|---|---|---|---|---|
| 6,138,389 A | * | 10/2000 | Kanazawa | D06F 75/38 38/93 |
| 6,477,133 B1 | * | 11/2002 | Yoshimura | G11B 33/08 720/702 |
| 6,693,746 B1 | * | 2/2004 | Nakamura | G02B 1/111 359/580 |
| 6,818,287 B1 | * | 11/2004 | Ogawa | B32B 27/08 396/452 |
| 6,888,593 B1 | * | 5/2005 | Nakamura | G02B 1/111 349/137 |
| 7,811,664 B2 | * | 10/2010 | Sasaki | A47J 36/025 428/325 |
| 8,129,022 B2 | * | 3/2012 | Aruga | C08J 5/18 106/434 |
| 8,241,529 B2 | * | 8/2012 | Fukumura | C08F 14/18 252/516 |
| 8,685,533 B2 | * | 4/2014 | Katayama | A01G 9/1438 428/323 |
| 8,802,968 B2 | * | 8/2014 | Aruga | B32B 7/12 136/251 |
| 9,074,058 B2 | * | 7/2015 | Morita | B32B 27/28 |
| 9,588,401 B2 | * | 3/2017 | Matsuda | G03B 9/40 |
| 2016/0004030 A1 | * | 1/2016 | Shiramizu | G02B 7/08 359/826 |

FOREIGN PATENT DOCUMENTS

| | | | | |
|---|---|---|---|---|
| JP | 2008-152146 A | | 7/2008 | |
| JP | 2008152146 | * | 7/2008 | G03B 9/36 |
| JP | 2010-217713 A | | 9/2010 | |
| JP | 2010217713 | * | 9/2010 | G03B 9/02 |
| JP | 2015-193214 A | | 11/2015 | |
| WO | 2006/020619 A1 | | 2/2006 | |
| WO | WO-2006020619 A1 | * | 2/2006 | B32B 5/14 |

* cited by examiner

×200 $\overline{100\mu m}$

×10,000 $\overline{1\mu m}$

FILM FORMED ON A SLIDING SURFACE OF A COMPONENT

BACKGROUND OF THE INVENTION

Field of the Invention

The present invention relates to a film (hereinafter referred to as a sliding film) of a sliding portion of a shutter of an optical device such as a digital camera, formed to reduce slide friction of the sliding portion.

Description of the Related Art

In recent years, focal-plane shutters used for single-lens reflex digital cameras for example have a blade mechanism portion as illustrated in FIG. 5 as an example.

A blade mechanism portion 1 includes light shielding blades 2, blade arms 3 to drive the light shielding blades 2, and crimping pins 4 to fix the light shielding blades 2. The light shielding blades 2 reciprocate at high speed, so that opening and closing of the optical path, that is, the exposure time is controlled.

FIG. 6 is a cross-sectional view of one of the crimping pins 4 and its surroundings. The crimping pins 4 and the light shielding blades 2 are fixed to each other by crimping the crimping pins 4. The blade arms 3 and the crimping pins 4 are joined so that the blade arms 3 rotate and slide in a state having a slight gap.

In the blade mechanism portion having such a structure, since the light shielding blades reciprocate at high speed, abrasion powder may be produced in the sliding portion. The abrasion powder may fly onto optical components or sensors, possibly causing defects of an image.

Japanese Patent Application Publication No. 2008-152146 describes a surface treatment method. In this method, the whole surface of a sliding portion is coated with eutectoid plating material of fluorine-based compound, to reduce friction produced in the sliding portion including crimping pins and blade arms while reducing the abrasion powder.

In addition, Japanese Patent Application Publication No. 2010-217713 describes a method to reduce the abrasion powder. In this method, an underlying layer of nickel or nickel alloy is formed on a sliding portion, and a surface layer is formed so as to cover the underlying layer. The surface layer is made of a composite metal in which a fluorine-based compound is co-deposited.

As imaging sensors and lenses are improved, the focal-plane shutter is increasingly required to have its even faster blade speed. In addition, the focal-plane shutter is also required to stably keep its high speed performance for a long time from the beginning of use.

Thus, in the sliding portion of a shutter, some components move relative to each other at an extremely high speed, and slide on each other, while pressing each other with a small force. In the surface treatment method described in Japanese Patent Application Publication No. 2008-152146 or No. 2010-217713, the abrasion powder produced in the sliding portion can be reduced to some extent.

However, in the shutter that is coated with the eutectoid plating material, metal components will contact each other in the sliding portion in an early stage after the beginning of use, so that the frictional force may increase due to abrasion. That is, in the shutter whose sliding portion is coated with the conventional plating film in which a fluorine-based compound is co-deposited, the content of the fluorine-based compound cannot be sufficiently increased in the vicinity of the surface of the film. As a result, the blade speed may change significantly in a relatively early stage after the beginning of use. As countermeasures to this, a pre-conditioning interim operation could be performed until the blade speed becomes stable, before the shutter is shipped as a product. However, this may increase cost.

For this reason, there is desired a sliding film which keeps its low friction from when the sliding film was produced, and which hardly changes its frictional force even when a user continues to use the sliding film.

SUMMARY OF THE INVENTION

According to one aspect of the present invention, a film formed on a sliding surface of a component and containing fluororesin, the film includes a surface structure in which convex portions are joined with each other like a mesh. Each of the convex portions is formed by particles of fluororesin having aggregated.

Further features of the present invention will become apparent from the following description of exemplary embodiments with reference to the attached drawings.

DESCRIPTION OF THE EMBODIMENTS

Figure 1A:
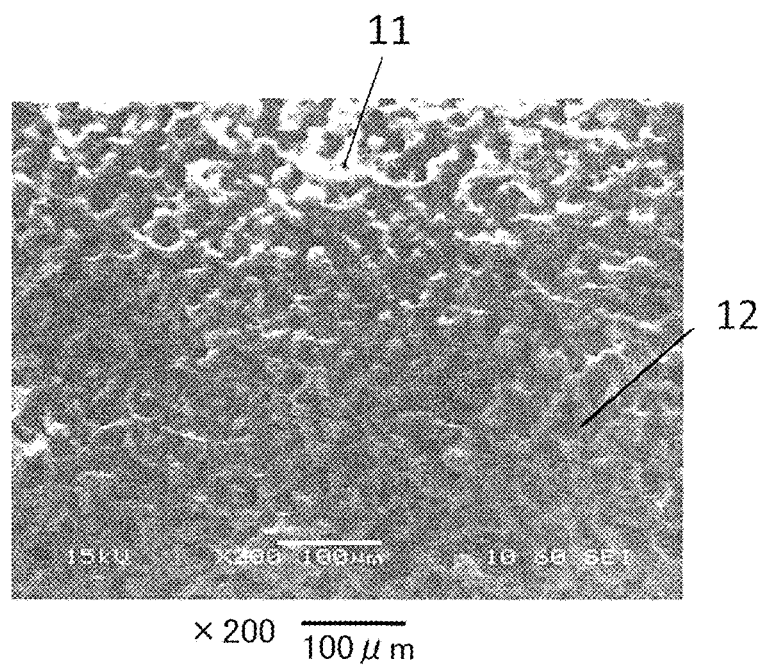
FIG. 1A is an image of a sliding film of an embodiment, observed at a magnification of 200 by using a scanning electron microscope (SEM).

The blade speed changes with the use of the shutter. Some possible reasons of this are as follows: the frictional force changes due to abrasion of the sliding film; the accuracy of form of a component deteriorates due to plastic deformation of the component; and a component is damaged due to fatigue. Among these reasons, the most possible reason of the significant change of the blade speed in a relatively early stage after the beginning of use is that the frictional force changes due to abrasion of the sliding film.

Conventionally, it is known that the fluororesin has a small coefficient of friction, and thus the fluororesin has been used for sliding films. However, the fluororesin itself is low in strength. For this reason, the fluororesin has been used by increasing its strength by mixing the fluororesin into a high-strength resin or a plating film, or by increasing its binding force by melting the fluororesin to form a film of the fluororesin. Nevertheless, the change in the frictional force due to abrasion of the sliding film occurs in a relatively early stage after the beginning of use of the shutter.

In the present invention, the surface of the sliding film is provided with convex portions formed by aggregated fine particles of fluororesin. With the convex portions, the coefficient of static friction can be lowered, and thereby the shearing force applied to the sliding film can be reduced. In addition, the sliding film of the present invention contains more polyamide-imide resin or polyimide resin in a portion which is in contact with the substrate of the shutter, and more fluororesin in a portion which is on the surface side. Thus, the sliding film can have an excellent adhesional property and a smaller slide resistance.

In addition, the sliding film of the present invention has a microstructure in which the convex portions, formed by the aggregated fine particles of fluororesin, seem to be joined with each other like a mesh when viewed from above. In other words, the sliding film has a shape in which, microscopically, the convex portions seem like mountain ridges connected with each other. Since the sliding film of the present invention keeps its small static friction from when produced, the shearing force applied to the sliding film is small. Furthermore, since the sliding film has the convex portions, which seem like mountain ridges connected with each other like a mesh, the area and the shape of the contact surface of the convex portions hardly change, even when the height of the convex portions is reduced by the abrasion during the use of the sliding film.

Therefore, the sliding film of the present invention can significantly reduce the change in blade speed which occurs in the conventional shutter in a relatively early stage after the beginning of use.

Hereinafter, an embodiment of the present invention will be specifically described with reference to the accompanying drawings.

First, there will be described a coating material which is used as a material to form the sliding film of the present embodiment.

Coating Material for Sliding Film

The coating material is produced by using a mixed solvent which contains an organic solvent, water, and dispersed particles (primary particles) of fluororesin. The organic solvent used is preferably a polar solvent. Specifically, the organic solvent may be N-Methyl-2-pyrrolidone (NMP), dimethyl sulfoxide (DMSO), N,N-dimethylformamide (DMF), N,N-dimethylacetamide (DMAc), tetrahydrofuran (THF), or an alcohol such as furfuryl alcohol. The fluororesin used is preferably polytetrafluoroethylene (PTFE) resin for its easy availability. However, the fluororesin may be tetrafluoroethylene-perfluoroalkoxy ethylene copolymer (PFA), tetrafluoroethylene-hexafluoropropylene copolymer (FEP), polyethylene-tetrafluoroethylene (ETFE), polyvinylidene fluoride (PVDF) resin, or polychlorotrifluoro-ethylene (PCTFE) resin.

The coating material contains another resin component. The resin component is not limited to a specific component as long as the other resin component satisfies a desired value in a property, such as adhesion strength. Preferably, the other resin component may be a known imide-based resin, such as a polyimide resin, a polyamide-imide resin, or a polyetherimide resin. The other resin component may be a precursor polyamic acid in accordance with solubility of the other resin component to the mixed solvent. In addition, the coating material may contain another solvent, surfactant, or inorganic filler such as carbon black.

The contents of the components of the coating material may be as follows: the organic solvent, 5 percent by weight or more and 30 percent by weight or less; the water, 30 percent by weight or more and 70 percent by weight or less; the fluororesin, 5 percent by weight or more and 40 percent by weight or less; and the imide-based resin, 2 percent by weight or more and 30 percent by weight or less. The viscosity of the coating material may be in 90 to 300 mPa·s.

The average size of the particles of fluororesin is preferably 0.1 μm or more and 1.0 μm or less, and more preferably, 0.1 μm or more and 0.3 μm or less. For the above-described PTEF, POLYFLON™ PTFE RUBURON (product number: LDW-410, manufactured by Daikin Industries, Ltd.) or Teflon™ PTFE DISPERSION (product number: 31-JR, manufactured by Du Pont) may be used.

Preferably, the coating material, used as the material for the sliding film of the present embodiment, has a lower viscosity to easily form the convex portions, which are joined with each other like a mesh. Here, the convex portions are each formed by fluororesin particles having been liquid-bridged and aggregated after a coating process. The dispersion-based coating material, in which the particles of fluororesin are dispersed in the water, contains more fluororesin and keeps its low viscosity, compared to a coating material in which a fluororesin is directly mixed in a binder resin. In addition, since the mixed solvent contains the organic solvent, the imide-based resin can be dissolved in the coating material, keeping the low viscosity of the coating material.

Method of Forming Sliding Film

FIGS. 2A to 2D schematically illustrate a manufacturing process for forming the sliding film of the present embodiment. As illustrated in FIGS. 2A to 2D, the sliding film of the present embodiment can be formed by performing the manufacturing process in the order of (a) coating process, (b) drying process, (c) warm light-press process, and (d) baking process.

(A) Coating Process

Figure 2A:
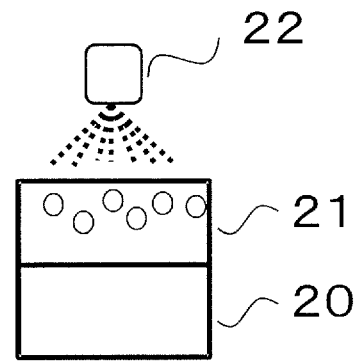
FIG. 2A is a schematic diagram illustrating a coating process of a manufacturing process of an embodiment.
Figure 2B:
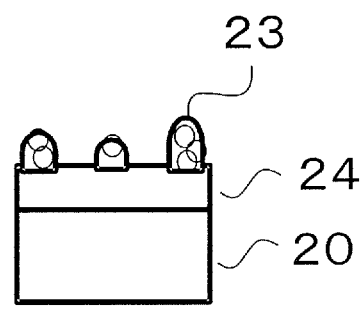
FIG. 2B is a schematic diagram illustrating a drying process of the manufacturing process of the embodiment.
Figure 2C:
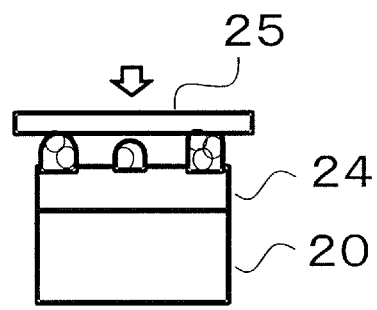
FIG. 2C is a schematic diagram illustrating a warm light-press process of the manufacturing process of the embodiment.
Figure 2D:
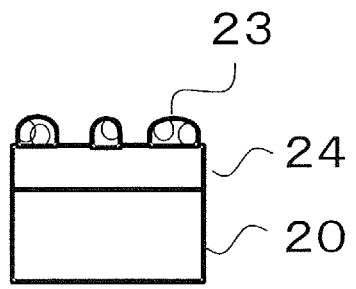
FIG. 2D is a schematic diagram illustrating a baking process of the manufacturing process of the embodiment.

The above-described coating material for the sliding film will be applied to a surface of a sliding member 20 which is made of metal for example. In this case, the coating method used is preferably a method which allows the shearing force, applied in a direction in which the sliding surface extends, to be reduced as much as possible. Preferably, the sliding member 20 is placed, as illustrated in FIG. 2A, such that the coated surface is horizontal, and then a spraying nozzle 22 is used to coat the coated surface with a predetermined amount of coating material 21 by using a spraying method which uses atomized coating material. The spraying method is used to easily form the microstructure in which the convex portions, formed by the fine particles of fluororesin having been aggregated after the coating, seem to be joined with each other like a mesh. Specifically, when fine droplets which are like fog are sprayed, moisture of the droplets evaporates while the droplets fly from the nozzle to the coated surface. Then, after the droplet reaches the coated surface, the particles of fluororesin attract each other and aggregate via the liquid bridge. As a result, the convex portions, which are joined with each other like a mesh, are easily formed.

On the other hand, if another coating method, such as spin coating, blade coating, die coating, dipping, or air knife coating, which applies a shearing force in a direction in which the coated surface extends is used, there would be easily formed a single-particle film in which primary particles of fluororesin are arranged uniformly in a direction in which the coated surface extends. These methods are suitable for forming a thin and uniform film, such as a resist film formed in a semiconductor manufacturing process. However, as in the present embodiment, in the case where the surface of the present embodiment has the shape in which the mesh-like mountain ridges are formed by the convex portions formed by the aggregated particles, the method that reduces the shearing force is suitably used.

(B) Drying Process

A drying furnace which is set at a temperature of 80 to 180 degrees Celsius is used, and the moisture of the coating material 21 is evaporated by heating the coating material 21 in the air. The coating material 21 is treated at an appropriate temperature for an appropriate period of time, so that the surface of the coating film is formed to a certain extent where the coating material on the coating film does not adhere to an object when the object touches the coating material.

Then, convex portions 23 and a resin portion 24 are formed on the metal-made sliding member 20. The convex portions 23 are each formed by the particles of fluororesin having aggregated and piled up, and the resin portion 24 fills spaces between the convex portions 23. Here, since FIGS. 2A to 2D are the schematic diagrams, the convex portions 23 and the resin portion 24 are illustrated as separated bodies having a boundary. However, a boundary portion between the convex portions 23 and the resin portion 24 may contain particles of fluororesin which are slightly dispersed in the boundary portion.

(C) Warm Light-Press Process

Thus, the convex portions 23 are formed on the top surface of the coating film after the drying process, by the particles of fluororesin having aggregated and piled up. In this process, some convex portions 23 which are extremely high are pressed to adjust their heights. If the extremely high convex portions 23 are left, only the extremely high convex portions 23 would contact another member in an early stage, when the coating film is used as a sliding film. As a result, the extremely high convex portions 23 are abraded earlier, and causes a significant change in the coefficient of friction while a user uses the sliding film. That is why the extremely high convex portions 23 are pressed.

Specifically, the surface of the coating film is pressed by applying a light load of 10 Pa or less to the surface, by using a metal-made pressing tool 25 heated at a temperature in a range of 80 degrees Celsius or more and 250 degrees Celsius or less. The pressing condition is not limited to the above example. However, if the load is too heavy, the convex portions would be too flattened and the mesh-like three-dimensional structure would be deformed. For this reason, an appropriate amount of pressure is set.

In a case where the variation in the heights of the convex portions is within a predetermined range, depending on conditions of the coating process and the drying process, the warm light-press process may be omitted.

(D) Baking Process

The coating material is baked to imidize the imide-based resin contained in the resin portion 24. If the baking temperature is too low, the imidization does not proceed, and a sufficient adhesive force is not produced between the sliding film and the metal-made sliding member 20. On the other hand, if the baking temperature is too high, the fluororesin completely melts, and the shape of the convex portions 23, formed by the aggregated particles of fluororesin, is not kept. For this reason, the baking is performed in a temperature range in which the imidization proceeds and the shape of the particles of fluororesin is kept. Preferably, the baking is performed in a temperature range from a temperature at which the imidization of the resin portion 24 starts, to a temperature lower than a melting point of the fluororesin. For example, in a case where PTFE particles are used as the fluororesin, and polyamic acid is used as the other resin component, the baking may be performed in a temperature range of 150 degrees Celsius or more and less than 327 degrees Celsius.

Shape of Sliding Film

Figure 1B:
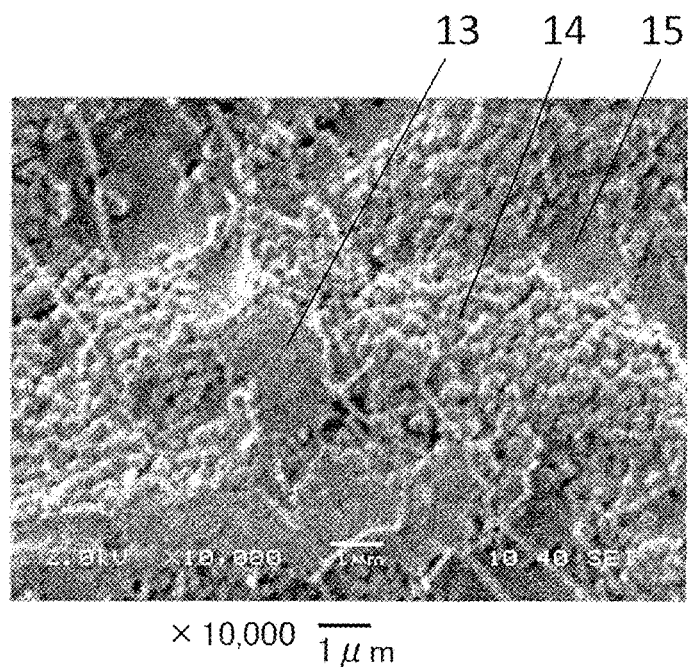
FIG. 1B is an image of the sliding film of the embodiment, observed at a magnification of 10,000 by using the SEM.

FIGS. 1A and 1B are images of the sliding film observed by using a scanning electron microscope (SEM). The sliding film was produced by using a solution containing PTFE particles as the fluororesin, N-Methyl-2-pyrrolidone (NMP) as the organic solvent, and polyamic acid as the other resin component, and by using the above-described forming method. FIG. 1A is an image at a magnification of 200, observed by using the SEM; and FIG. 1B is an image at a magnification of 10,000, observed by using the SEM.

In the SEM image of FIG. 1A, portions which look white are convex portions 11 containing more PTFE. In contrast, portions which look black are concave portions 12. The concave portions 12 are lower than the convex portions 11 and concave. The concave portions 12 contain more polyamide-imide resin or polyimide resin. However, the concave portions 12 may also contain a single-particle film of PTFE, in addition to the polyamide-imide resin or the polyimide resin.

As clear in FIG. 1A, the surface of the sliding film has the microstructure in which the convex portions containing more PTFE seem to be joined with each other like a mesh when viewed from above. Sizes of openings of the mesh vary, but more than 60% of the mesh has openings whose long diameters are 5 μm or more and 200 μm or less.

In addition, as can be seen in FIG. 1B that is the SEM image having the higher magnification, in the convex portions 11 containing more PTFE, the shape of the primary particles of PTFE is kept. The convex portions each include a fine-particle aggregation portion 14 in which the PTFE primary particles are aggregated and piled up. A top portion 13 of the convex portions 11 is a portion whose height is adjusted through the warm light-press process. Thus, the fine-particle aggregation has such a shape as could be obtained by pressing and flattening the fine-particle aggregation. Furthermore, in the bottom surface of each of the concave portions 15, the polyamide-imide resin or the polyimide resin constituting the underlying layer formed under the convex portions is exposed.

In addition, it was confirmed through a cross-section observation and a μFT-IR measurement that, in the sliding film of the present embodiment, more polyamide-imide resin or polyimide resin exists in a portion on the metal-made substrate side and more PTFE resin exists in a portion on the sliding-film surface side.

In the structure in which the fluororesin exists more on the surface side than on the substrate side, the rate of the fluororesin to the whole of the sliding film is preferably 30 percent by mass or more to reduce the friction, and more preferably, 50 percent by weight or more.

Figure 3A:
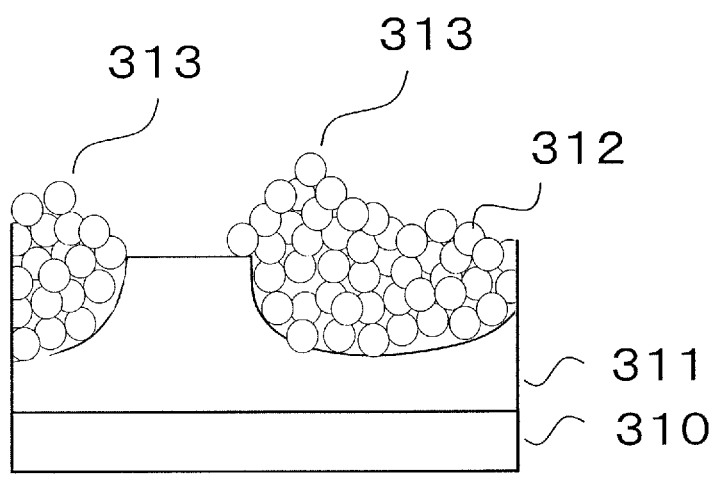
FIG. 3A schematically illustrates a cross section of a sliding film of an embodiment.

FIG. 3A is a schematic diagram illustrating a cross section of one example of the sliding film of an embodiment. FIG. 3A depicts a substrate 310 of a metal-made sliding member which may be made of stainless steel (SUS), a resin portion 311 which contains polyamide-imide resin and/or polyimide resin as a main component, PTFE particles 312, and convex portions 313 formed by the aggregated PTFE particles 312. The convex portions 313 protrude from the surface of the resin portion 311 of the polyamide-imide resin and/or the polyimide resin, and are joined with each other like a mesh when viewed from above.

Polyamide-imide resin and/or polyimide resin firmly adheres to metal in the process of imidization. Thus, a high adhesive force can be achieved between the surface of the substrate of the metal-made sliding member and the sliding film. In addition, since the convex portions containing PTFE as a main component are joined with each other like a mesh, the interface between the portions containing PTFE as a main component and the polyamide-imide resin and/or the polyimide resin has a complicated shape. As a result, an anchor effect is produced between the portions containing PTFE as a main component and the polyamide-imide resin and/or the polyimide resin. Thus, the portions containing PTFE as a main component and the polyamide-imide resin and/or the polyimide resin firmly adhere to each other, and do not peel off at the interface.

The thickness of the sliding film, that is, the distance from the interface between the slide film and the substrate to the highest point (top) of the convex portions is preferably 1 µm or more and 20 µm or less, and more preferably, 3 µm or more and 8 µm or less. If the thickness of the sliding film is too small, the amount of the fluororesin is insufficient. As a result, the fluororesin fails to form the convex portions having a sufficient height, and thus makes it difficult to allow the convex portions to join with each other like a mesh. In contrast, if the thickness of the sliding film is too large, the amount of elastic deformation of the sliding film increases in a direction in which a cross section of the sliding film extends, in the sliding process. This is because the fluororesin has a low elastic coefficient. As a result, the resistance against the elastic deformation and the contact area are increased, and thus the frictional force is increased.

The above-described sliding film can lower the frictional force of the sliding member, and significantly reduce the shearing force applied to the sliding film. In addition, the adhesive force between the sliding film of fluororesin and the metal-made substrate is increased. Thus, the sliding film can keep its initial frictional force. The reason can be explained as follows.

The convex portions, constituted by the aggregation of the fluororesin particles, are formed on the surface of the sliding film which contacts another member. The convex portions are more easily deformed than a surface which is formed by a melted and solidified fluororesin. Thus, when the other member contacts the sliding film, the sliding film forms its surface such that the convex portions fit the contact surface of the other member. In addition, the convex portions are joined with each other like a mesh. Thus, the contact between the contact surface of the other member and the member other than the fluororesin, such as the imide-based resin, is prevented. That is, the sliding film has a minimum area of its sliding surface in accordance with the contact surface of the other member, from the beginning of use, and thus can produce an extremely low frictional force. In addition, since the convex portions are joined with each other like a mesh, the change of the area of the sliding surface due to abrasion of the sliding film is suppressed, and thus the sliding film can keep its initial frictional force.

Contact Angle to Water

The contact angle to water of the sliding film of the present embodiment was measured. As the contact angle increases, the surface free energy decreases, and thus the coefficient of static friction decreases.

The contact angle of the sliding film of the present embodiment on which the warm light-press process had been performed was 128 degrees. The contact angle of the sliding film of the present embodiment on which the warm light-press process had not been performed was 134 degrees. For comparison, the measurement of the contact angle was also performed on a fluororesin plate whose surface was flat and smooth, and on another fluororesin plate whose surface was roughened through machining. The contact angle of the former was 110 degrees, and the contact angle of the latter was 117 degrees.

As can be seen, the sliding films of the present embodiment have the larger contact angles than those of the fluororesin plates, and thus having sufficiently small coefficients of static friction. Here, the contact angle of the sliding film on which the warm light-press process had been performed was smaller than the contact angle of the sliding film on which the warm light-press process had not been performed. This is probably because variation in heights of the convex portions was reduced through the warm light-press process, and thus the effect by the microstructure was reduced.

The contact angle to water of the sliding film of the present embodiment may vary depending on a manufacturing condition. Preferably, the manufacturing condition is selected so that the contact angle becomes equal to or larger than 120 degrees, for reducing the coefficient of static friction and keeping the initial frictional force.

Hereinafter, specific examples of the fluorine-based sliding film of the present invention will be described, together with some comparative examples. In the following examples, there will be described some results obtained in cases in which the sliding film was applied to blade arms of sliding members of a camera shutter. The application of the sliding film of the present invention, however, is not limited to these examples.

EXAMPLES

Example 1

The fluorine-based sliding film of Example 1 was made in the following processes. The metal substrates of the blade arms of the focal-plane shutter were made of carbon tool steel (SK material). First, triiron-tetraoxide coating was applied to the surface of the SK material, and then the sliding film was formed on the SK material by using the previously-described sliding film forming method. The PTFE particles used as the fluororesin particles had a diameter of 200 to 300 nm. The coating material was prepared by mixing the components at the following rate.

| | |
|---|---|
| PTFE particles | 22 percent by weight |
| organic solvent (NMP + alkyl ether) | 22 percent by weight |
| polyamic acid | 10 percent by weight |
| water | 45 percent by weight |
| carbon black | 1 percent by weight |

The condition of each process is described below.
(a) coating process: the substrate was temporarily fixed such that the surface of the substrate to be coated was horizontal, and the coating film was formed by using the spraying method which uses atomized coating material.
(b) drying process: the coating film was dried for seven minutes in an electric furnace which was set at 180 degrees Celsius.

(c) warm light-press process: the coating film was applied with a pressure of 6 Pa for seven minutes, while kept at 220 degrees Celsius.

(d) baking process: the coating film was left in an electric furnace which was set at 300 degrees Celsius, for 15 minutes.

Figure 5:
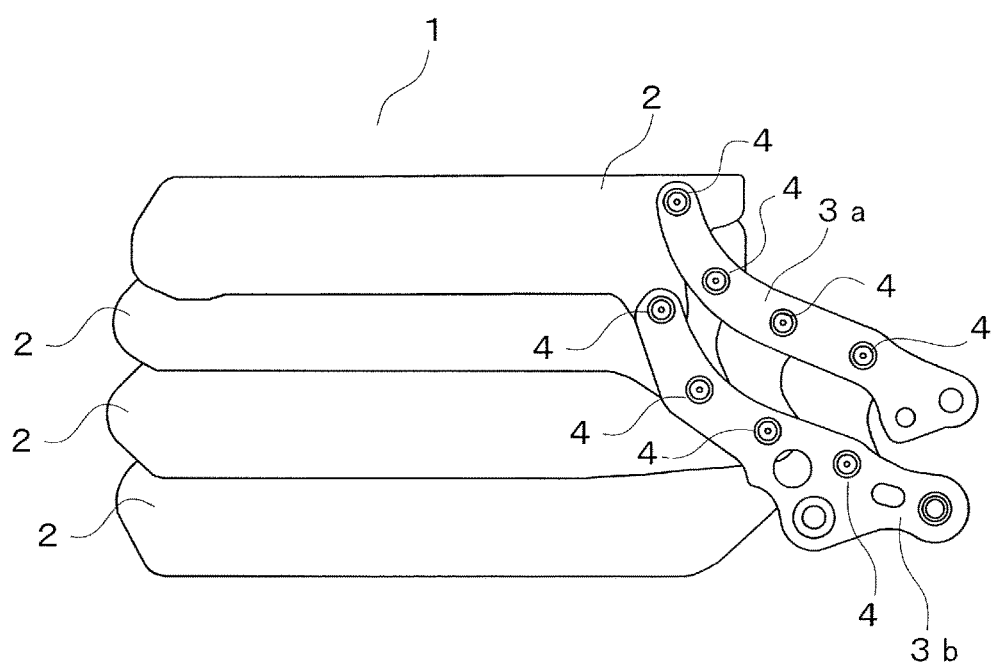
FIG. 5 illustrates a blade mechanism portion of a shutter.
Figure 6:
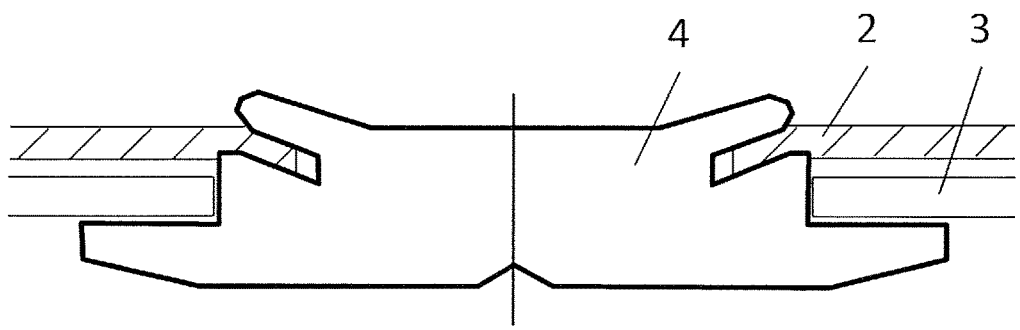
FIG. 6 is a cross-sectional view of a crimping pin and its surroundings of the blade mechanism portion.

The sliding film formed through the above-described processes had a thickness of 3 µm, and the contact angle to water of the surface of the sliding film was 128 degrees. The surface of the sliding film, observed by using the SEM, seemed to be the mesh-like mountain ridges, formed by the fine particles of fluororesin having piled up. The rate of the fluororesin contained in the sliding film was 60 percent by weight, in a semi-quantitative analysis which was performed on an area of 1 mm$^2$, at a position outside the coating-film surface, by using a scanning electron microscope (SEM)-energy dispersive spectroscopy (EDS). Then, crimping pins made of free-cutting steel of stainless steel (SUS) 430 were used to fix the light shielding blades to the blade arms on which the above-described sliding film was formed, and thus the blade mechanism portion of the shutter was made as illustrated in FIG. 5.

Example 2

The fluorine-based sliding film of Example 2 was made in the following processes. The metal substrates of the blade arms of the focal-plane shutter were made of carbon tool steel (SK material). First, triiron-tetraoxide coating was applied to the surface of the SK material, and then the sliding film was formed on the SK material by using the previously-described sliding film forming method.

The (c) warm light-press process was omitted.

The other processes used to make the fluorine-based sliding film were the same as those of Example 1, and thus the description of the conditions of those processes are omitted.

The coating film (sliding film) formed through the above-described processes had a thickness of 3 µm, and the contact angle to water of the surface of the coating film was 134 degrees. The surface of the coating film, observed by using the SEM, seemed to be the mesh-like mountain ridges, formed by the fine particles of fluororesin having piled up. As a result of the analysis performed in the same way as that in Example 1, the rate of the fluororesin contained in the coating film was 60 percent by weight. In addition, it was confirmed through a cross-section observation and a µFT-IR measurement to the coating film that more polyamide-imide resin or polyimide resin exists in a portion on the metal substrate side and more PTFE resin exists in a portion on the sliding-film surface side.

Then, crimping pins made of free-cutting steel of SUS430 were used to fix the light shielding blades to the blade arms on which the above-described sliding film was formed, and thus the blade mechanism portion of the shutter was made as illustrated in FIG. 5.

Comparative Example 1

The fluorine-based sliding film of Comparative Example 1 was made in the following processes.

The surfaces of the metal substrates of the blade arms of the focal-plane shutter were degreased and cleaned, and then plated with Ni—P alloy with a thickness of 2 to 3 µm to form an underlying layer. Then, the underlying layer was plated with Ni—P alloy, in which the PTFE particles having a size of 200 to 300 nm were co-deposited, with a thickness of 1 to 2 µm to form a surface layer.

The sliding film formed through the above-described processes had a thickness of 4 µm, and the contact angle to water of the surface of the sliding film was 105 degrees. The surface of the sliding film, observed by using the SEM, had a structure in which the plating film was dotted with fine particles of fluororesin. The rate of the fluororesin contained in the sliding film, which was determined in the same way as that of Example 1, was 20 percent by weight. In addition, it was confirmed through a cross-section observation and a measurement to the sliding film that the Ni—P alloy layer, in which the PTFE particles were co-deposited, was dotted with the PTFE particles, substantially uniformly in the film-thickness direction.

Then, crimping pins made of free-cutting steel of SUS430 were used to fix the light shielding blades to the blade arms on which the above-described sliding film was formed, and thus the blade mechanism portion of the shutter was made as illustrated in FIG. 5.

Comparative Example 2

The fluorine-based sliding film of Comparative Example 2 was made in the following processes.

The metal substrates of the blade arms of the focal-plane shutter were made of carbon tool steel (SK material). First, triiron-tetraoxide coating was applied to the surface of the SK material, and then the coating film was formed by using a coating process different from that of Examples 1 and 2. The condition of each process is described below.

(a) coating process: the coating film was formed by using spin coating. The coating was performed by rotating the same coating material as that of Example 1, at a rotational speed of 1,000 rpm for 30 seconds. The coating film was formed by repeating this coating process five times.

(b) drying process: the coating film was dried for seven minutes in an electric furnace which was set at 180 degrees Celsius.

(c) warm light-press process: the coating film was applied with a load of 100 mgf for seven minutes, while kept at 220 degrees Celsius.

(d) baking process: the coating film was left in an electric furnace which was set at 300 degrees Celsius, for 15 minutes.

The coating film formed through the above-described processes had a thickness of 3 µm, and the contact angle to water of the surface of the coating film was 125 degrees.

Figure 3B:
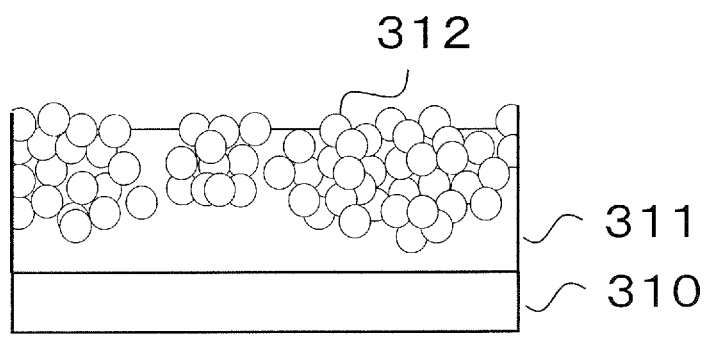
FIG. 3B schematically illustrates a cross section of a sliding film of Comparative Example 2.

The surface of the coating film, observed by using the SEM, had a structure in which the fine particles of fluororesin were arranged uniformly in a direction in which the coating film extends. This is probably because the coating was performed by using spin coating. FIG. 3B is a diagram schematically illustrating a cross section of the sliding film of Comparative Example 2. Compared to the embodiment illustrated in FIG. 3A, Comparative Example 2 of FIG. 3B has a structure in which the fine particles of fluororesin poorly aggregate and hardly form the convex portions.

It was observed that the rate of the fluororesin contained in the coating film of Comparative Example 2 is un-uniformly distributed in an in-plane direction. This is probably because the centrifugal force, applied in the spin coating, caused the fine particles of fluororesin to be distributed more on the edge side of the substrate, which was away from the center of the substrate. The rate of the fluororesin contained in the coating film was 60 percent by weight, in an area which had the maximum rate of the fluororesin. In addition, it was confirmed through a cross-section observation and a µFT-IR measurement to the coating film that, in an area which had a large rate of the fluororesin contained in the coating film, more polyamide-imide resin or polyimide resin exists in a portion on the metal substrate side and more PTFE resin exists in a portion on the sliding-film surface side.

Then, crimping pins made of free-cutting steel of SUS430 were used to fix the light shielding blades to the blade arms on which the above-described sliding film was formed, and thus the blade mechanism portion of the shutter was made as illustrated in FIG. 5.

Comparative Example 3

The fluorine-based sliding film of Comparative Example 3 was made in the following processes.

The metal substrates of the blade arms of the focal-plane shutter were made of carbon tool steel (SK material). First, triiron-tetraoxide coating was applied to the surface of the SK material, and then the sliding film was formed by using the same coating material as that of Example 1 and a coating process different from those of Examples 1 and 2. The condition of each process is described below.

(a) coating process: the substrate was temporarily fixed such that the surface of the substrate to be coated was horizontal, and the coating film was formed by using the spraying method which uses atomized coating material.

(b) drying process: the coating film was dried for seven minutes in an electric furnace which was set at 180 degrees Celsius.

(c) warm light-press process: the coating film was applied with a load of 100 mgf for seven minutes, while kept at 220 degrees Celsius.

(d) baking process: the coating film was left in an electric furnace which was set at 380 degrees Celsius, for 30 minutes.

The coating film formed through the above-described processes had a thickness of 3 µm, and the contact angle to water of the surface of the coating film was 120 degrees.

Figure 4:
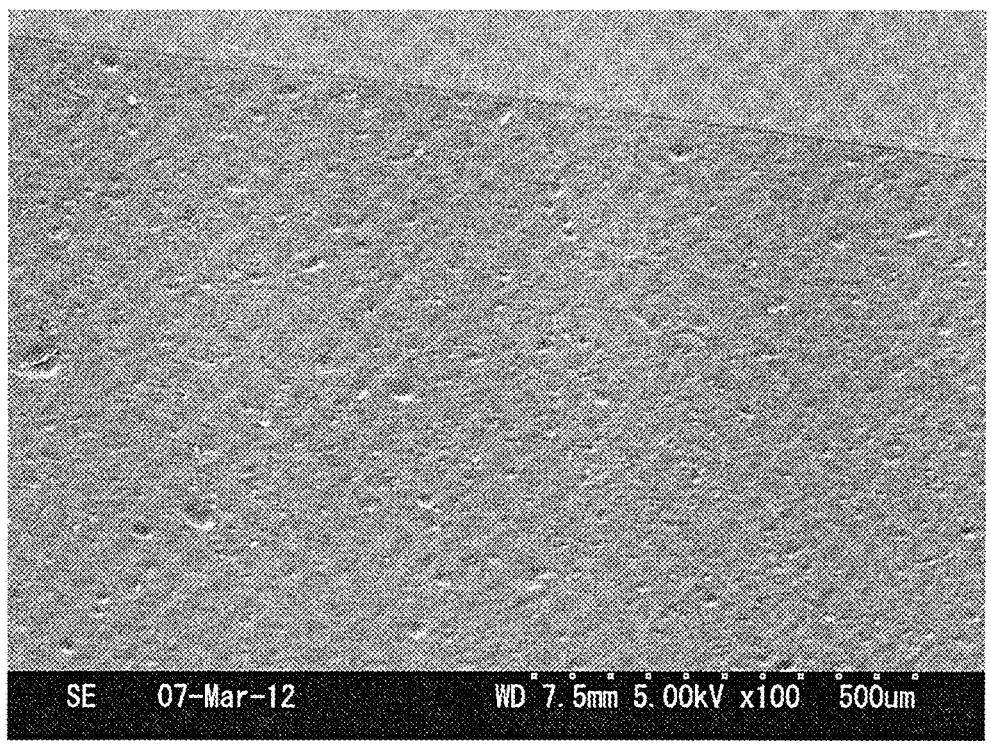
FIG. 4 is an image of a sliding film of Comparative Example 3, observed by using the SEM.

The surface of the coating film, observed by using the SEM, had a structure in which the fine particles of fluororesin had been melted and the film was flattened. This is probably because the baking process was performed at the high temperature of 380 degrees Celsius. FIG. 4 is an image observed by using the SEM. The fluororesin on the surface is flattened, and the convex portions joined with each other like a mesh, as in the embodiment of FIG. 1A, are not formed. The contact angle to water of Comparative Example 3 is smaller than those of Examples 1 and 2. This is probably because the convex portions joined with each other like a mesh were not formed, and the effect by the microstructure was not produced.

The rate of the fluororesin contained in the coating film was determined as 60 percent by weight, by calculating the rate by using the amount of the component of the coating material. In addition, it was confirmed through a cross-section observation and a µFT-IR measurement to the coating film that more polyamide-imide resin or polyimide resin exists in a portion on the metal substrate side and more PTFE resin exists in a portion on the sliding-film surface side. Then, crimping pins made of free-cutting steel of SUS430 were used to fix the light shielding blades to the blade arms on which the above-described sliding film was formed, and thus the blade mechanism portion of the shutter was made as illustrated in FIG. 5.

Properties of Examples and Comparative Examples

Change in the frictional force of the sliding films of the above-described Examples and Comparative Examples, and change in the blade speed of the shutters provided with the sliding films were evaluated and compared.

Change in Frictional Force of Sliding Film

To measure the frictional force, "Friction Player" (product name) manufactured by RHESCA Co., LTD. was used. The weight of a load was 50 gf in a measurement condition, and the evaluation was performed by using a flat-head pin having a diameter of φ5 and made of stainless steel (SUS), in a reciprocating-slide test mode performed in a width of 23 mm.

First, coefficients of friction in an early stage of the sliding were measured. Then, the sliding films were slid and reciprocated at a speed of 77 mm/sec, by a total length of 1 km. After that, coefficients of friction of the sliding films were measured, and changes in the coefficients of friction were determined by calculating the difference between the initial coefficients of friction and the coefficients of friction measured after the sliding.

Focal-plane shutters using the blade mechanism portions of the above-described Examples and Comparative Examples were made. Each of the shutters was integrated into a camera having an imaging lens, and multiple pictures were taken to evaluate the change in the blade speed of the shutters.

Figure 7:
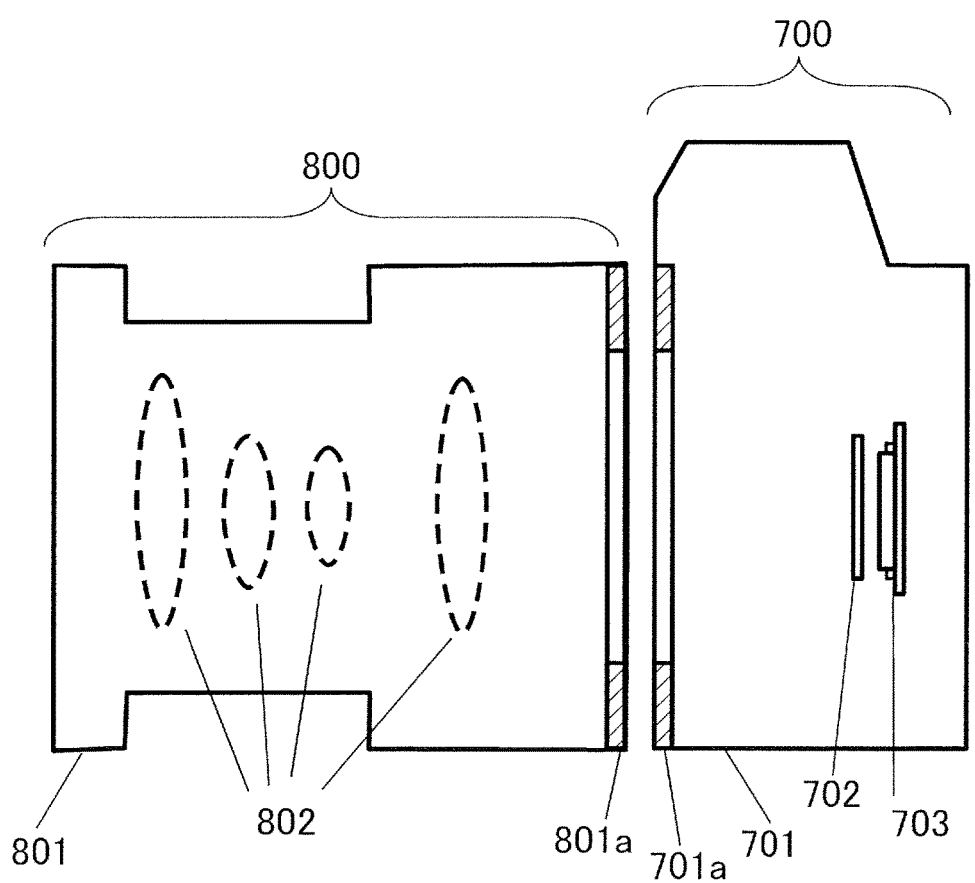
FIG. 7 is a diagram illustrating a schematic configuration of a camera of an embodiment.

FIG. 7 is a diagram illustrating a schematic configuration of a camera of a first embodiment of the present invention. A camera 700 may be a single-lens reflex digital camera. The camera 700 includes a camera body 700 which is a main body of the imaging apparatus, and an interchangeable lens (lens barrel) 800 which can be detachably attached to the camera body 700. In FIG. 7, the interchangeable lens 800 is attached to the camera body 700.

The camera body 700 includes a housing 701, a shutter 702, and an imaging device 703. The shutter 702 and the imaging device 703 are disposed in the housing 701. The interchangeable lens 800 includes a housing 801 for interchangeable lens, and an imaging optical system 802. The imaging optical system 802 is disposed in the housing 801, and forms an optical image on the light receiving surface of the imaging device 703 in a state where the housing 801 (interchangeable lens 800) is attached to the housing 701.

The housing 801 has a lens-side mount 801a in which an opening is formed. The housing 701 has a camera-side mount 701a in which an opening is formed. By engaging the lens-side mount 801a with the camera-side mount 701a, the interchangeable lens 800 (housing 801) is attached to the camera body 700 (housing 701).

The blade speed was measured when the number of releases of the shutter reached 25,000, 50,000, and 100,000, and a difference between an initial blade speed and a measured blade speed was calculated, as a rate of change. Then, the result was evaluated with symbols "A", "B", and "C". Here, "A" denotes that the change in blade speed is −1% or more and +1% or less; "B" denotes that the change in blade speed is −2% or more and +2% or less; and "C" denotes that the change in blade speed is smaller than −2% or larger than +2%. The evaluation of the change in blade speed of the shutter may be performed without a camera including an imaging lens. In this case, the evaluation may be performed with a focal-plane shutter alone. Table 1 tabulates the result on the change in frictional force and blade speed of Example 1, Example 2, Comparative Example 1, Comparative Example 2, and Comparative Example 3, measured by using the above-described evaluation method.

TABLE 1

|  | Change in frictional force (50 gf × 1 km) | Change in blade speed (25K) | Change in blade speed (50K) | Change in blade speed (100K) |
|---|---|---|---|---|
| Example 1 | 0.02 | A | A | B |
| Example 2 | 0.03 | A | A | B |
| Comparative Example 1 | 0.52 | B | B | C |
| Comparative Example 2 | 0.15 | B | B | C |
| Comparative Example 3 | 0.1 | B | B | C |

As illustrated in Table 1, Examples 1 and 2 have less change in frictional force, than Comparative Examples 1 to 3. Thus, when Example 1 or 2 is applied to the sliding member of the shutter, the change in blade speed can be suppressed in an early stage after the beginning of use. In addition, it was observed that Examples 1 and 2 produce less abrasion powder even when the number of releases is increased, and keep a stable frictional condition, compared to Comparative Examples 1 to 3.

From the above evaluation result, it can be understood that the sliding film of the present invention can reduce the change in blade speed of the focal-plane shutter, and in particular, can suppress the decrease in the blade speed in an early stage after the beginning of use. Therefore, a camera including an imaging lens and a focal-plane shutter having the sliding film of the present invention can take high-quality images stably over a long period of time. This is because the change in the operational property of the shutter can be suppressed even when the focal-plane shutter is operated multiple times at high speed. Although the sliding film was formed on the arms in the present examples, the sliding film may preferably be formed on the crimping pins in addition to the arms.

The embodiments of the present invention are not limited to the above-described embodiments. Composition of the sliding film and its materials, the thickness of the sliding film, or the manufacturing method of the sliding film may be changed as appropriate in accordance with an intended use. Although the PTFE particles are suitably used as fluororesin particles contained in a raw material, other particles may be contained. An object on which the sliding film is formed is not limited to the metal-made blade arms of the blade mechanism portion of the focal-plane shutter.

Figure 8:
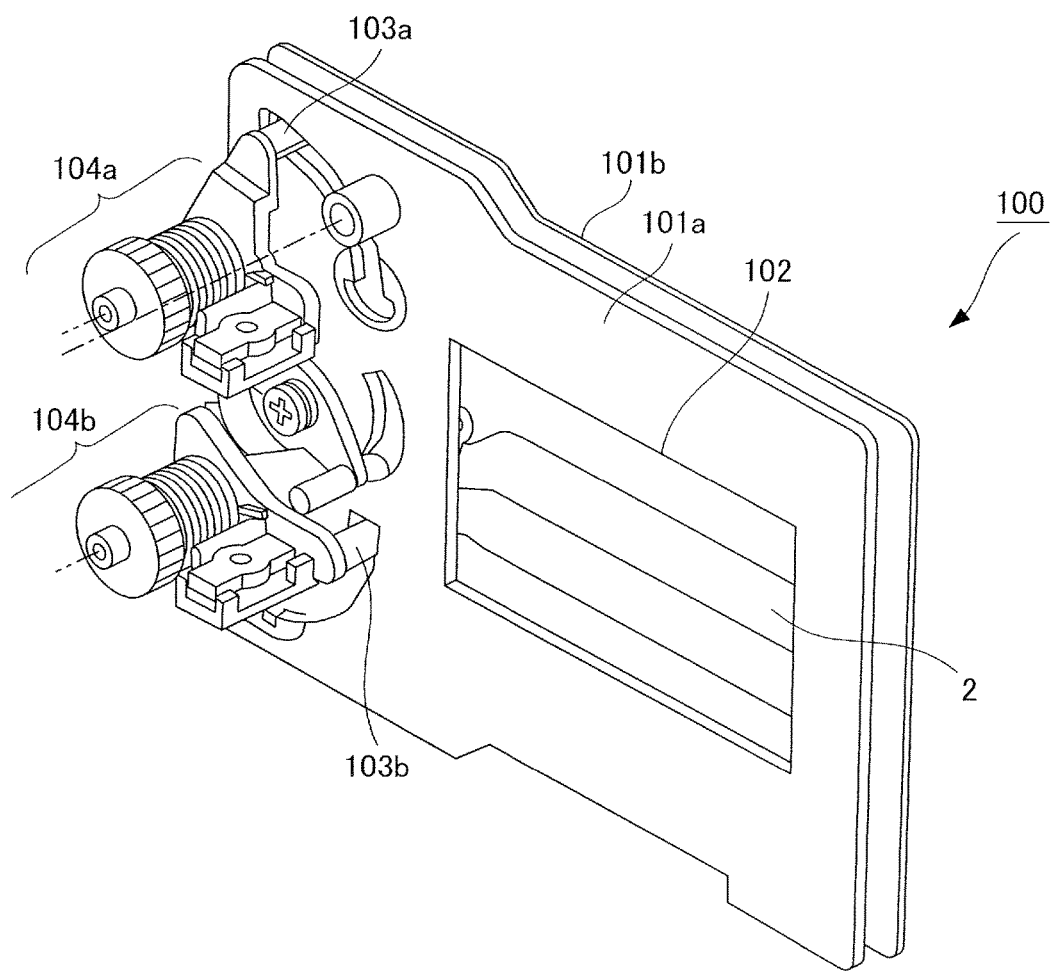
FIG. 8 illustrates an overall configuration of a focal-plane shutter.

FIG. 8 is an overall view of a focal-plane shutter 100. The focal-plane shutter 100 includes a base plate 101a, a cover plate 101b, and a blade mechanism portion. The base plate 101a and the cover plate 101b each include an exposure window 102, and face each other with a gap formed therebetween. The blade mechanism portion is interposed between the base plate 101a and the cover plate 101b. In FIG. 8, one portion of the light shielding blades 2 of the blade mechanism portion is seen from the exposure window 102 of the base plate 101a. The base plate 101a is provided with a blade driving mechanism 104a which drives blade arms 3a illustrated in FIG. 5, and with a blade driving mechanism 104b which drives blade arms 3b illustrated in FIG. 5. The blade driving mechanism 104a is joined with the blade arms 3a of FIG. 5 via a blade driving pin 103a, and pivots the blade arms 3a with the motion of the blade driving mechanism 104a. Similarly, the blade driving mechanism 104b is joined with the blade arms 3b of FIG. 5 via a blade driving pin 103b, and pivots the blade arms 3b with the motion of the blade driving mechanism 104b. The pivot of the blade arms 3a and 3b cause the light shielding blades 2 to open and close the exposure window 102. When the light shielding blades 2 open and close the exposure window 102, the light shielding blades 2 and the base plate 101a are rubbed against each other, and the light shielding blades 2 and the cover plate 101b are also rubbed against each other. This may cause the production of the abrasion powder in the sliding portion, and the change in blade speed after use of the shutter. For this reason, the sliding film is preferably formed at least on a surface of the base plate 101a which faces the light shielding blades 2, and on a surface of the cover plate 101b which faces the light shielding blades 2, by using the surface treatment method that performs the eutectoid plating with a fluorine-based compound. In addition, because the blade driving pin 103a and the base plate 101a may be rubbed against each other, and the blade driving pin 103b and the base plate 101a may also be rubbed against each other, the sliding film of the present invention may preferably be formed on the whole surface of the base plate 101a. In addition, the sliding film may be formed on at least one portion of sliding surfaces of components, but can be formed on the whole of the sliding surface. Thus, the sliding film of the present invention has a low frictional force from when the sliding film was produced, and has less change in the frictional force even if a user continues to use the sliding film. Therefore, the sliding film can be suitably used for a surface of various kinds of components which has a light weight and slides at high speed.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-099304, filed May 18, 2017, and Japanese Patent Application No. 2018-079418, filed Apr. 17, 2018, which are hereby incorporated by reference wherein in their entirety.

What is claimed is:

1. A film formed on a sliding surface of a component and containing fluororesin, the film comprising:
   a surface structure in which convex portions are joined with each other like a mesh,
   wherein each of the convex portions comprises a particle aggregation portion, which is formed by particles of fluororesin.

2. The film according to claim 1, wherein an average particle size of the particles of fluororesin is 0.1 μm to 1.0 μm.

3. The film according to claim 2, wherein the average particle size of the particles of fluororesin is 0.1 μm to 0.3 μm.

4. The film according to claim 3, wherein a fluororesin content in the film is 50 percent by weight or more.

5. The film according to claim 1, wherein a distance from a surface of the component on which the film is formed to a top of the convex portions is 1 μm to 20 μm.

6. The film according to claim 5, wherein the distance from the surface of the component on which the film is formed to the top of the convex portions is 3 μm to 8 μm.

7. The film according to claim 1, wherein 60 percent or more of openings of the surface structure each have a long diameter of 5 μm to 200 μm.

8. The film according to claim 1, wherein a fluororesin content in the film is 50 percent by weight or more.

9. The film according to claim 1, wherein a fluororesin content in the film is larger in a portion on a surface side than in a portion on a component side, in a thickness direction of the film.

10. The film according to claim 1, wherein the film comprises a portion formed between the convex portions; and
wherein the portion contains a polyimide and/or a polyamide-imide.

11. The film according to claim 10, wherein a polyimide content and/or a polyamide-imide content in the film is larger in a portion on a component side than in a portion on a surface side, in a thickness direction of the film.

12. The film according to claim 1, wherein the fluororesin is tetrafluoroethylene resin.

13. The film according to claim 1, wherein a contact angle to water of the film is equal to or larger than 120 degrees.

14. A focal-plane shutter comprising:
a base plate and a cover plate each comprising an exposure window and facing each other with a gap formed therebetween;
a light shielding blade interposed between the base plate and the cover plate; and
a blade arm fixed on the light shielding blade,
wherein the film according to claim 1 is formed on at least one portion of a sliding surface of the blade arm.

15. The focal-plate shutter according to claim 14, wherein the film is formed on at least a surface of the base plate, wherein the surface of the base plate faces the light shielding blade,
wherein the film is formed on at least a surface of the cover plate, and
wherein the surface of the cover plate faces the light shielding blade.

16. The focal-plate shutter according to claim 14, wherein the light shielding blade is fixed on the blade arm by a crimping pin, and the film is formed on a surface of the crimping pin.

17. A camera comprising:
the focal-plane shutter according to claim 14; and
an imaging lens.

18. A method of manufacturing a film, wherein the film is the film according to claim 1, the method comprising:
coating the component with a coating material by using a spraying method, the coating material containing a solvent, an imide-based resin, and the particles of fluororesin; and
baking the component, coated by using the spraying method, at a temperature, which is equal to or higher than an imidization-start temperature of the imide-based resin, and which is lower than a temperature of a melting point of the fluororesin.

19. The method according to claim 18, wherein the solvent contains N-Methyl-2-pyrrolidone and water,
wherein the particles of fluororesin comprise particles of tetrafluoroethylene resin, and
wherein the imide-based resin comprises polyamic acid.

\* \* \* \* \*